W. H. JOHNSON.
GLOBE VALVE.
APPLICATION FILED JUNE 13, 1919.
1,346,210.
Patented July 13, 1920.
2 SHEETS—SHEET 1.
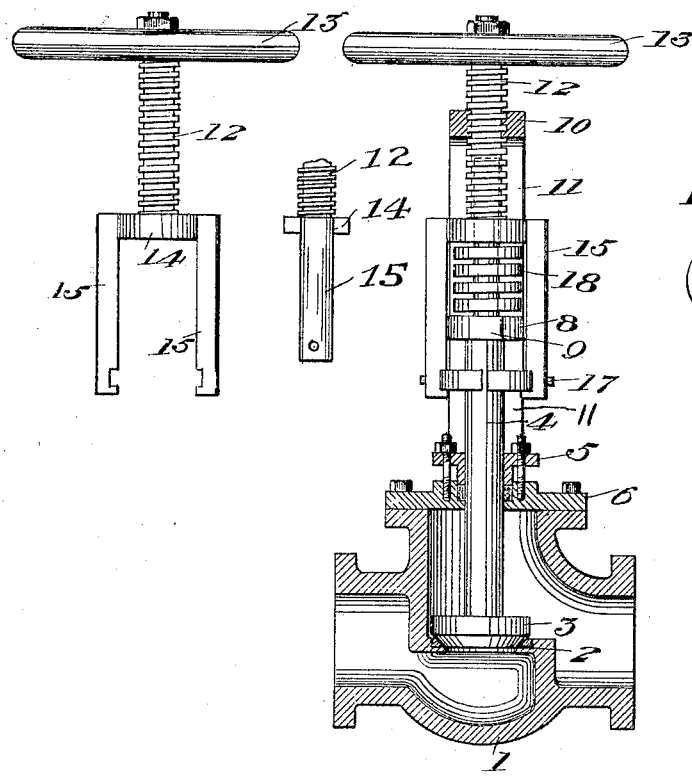
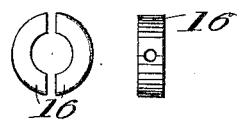
WITNESSES
INVENTOR
W. H. JOHNSON,
BY
ATTORNEYS

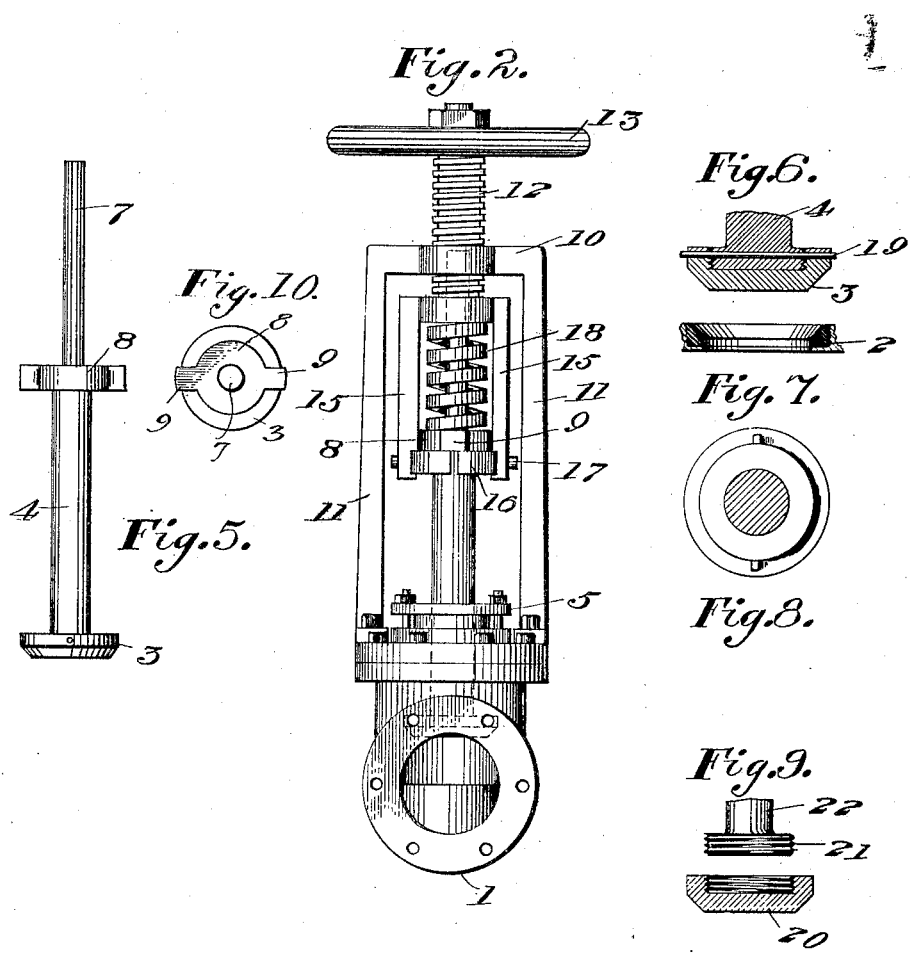

UNITED STATES PATENT OFFICE.

WILLIE HARRY JOHNSON, OF CHICAGO, ILLINOIS.

GLOBE-VALVE.

1,346,210.  Specification of Letters Patent.  Patented July 13, 1920.

Application filed June 13, 1919. Serial No. 303,881.

*To all whom it may concern:*

Be it known that I, WILLIE HARRY JOHNSON, a citizen of the United States, and a resident of Chicago, in the county of Cook and State of Illinois, have invented certain new and useful Improvements in Globe-Valves, of which the following is a specification.

My invention is an improvement in globe valves, and has for its object to provide mechanism in connection with valves of the character specified, so arranged that whenever the valve is turned to open or close, it will be ground at its seat to provide for intermittent regrinding of the contact surfaces of the valve and seat, and wherein the controlling mechanism is outside the valve casing.

In the drawings:

Figure 1 is a vertical section with the valve seated,

Fig. 2 is a side view,

Fig. 3 is a detail side view of the screw and its connections, looking at opposite sides of the same, Fig. 4 is a plan and edge view of the split ring, Fig. 5 is a side view of the valve and stem, Fig. 6 is a vertical section through the valve and stem showing the connection of the valve to the stem, Fig. 7 is a sectional view of the seat, Fig. 8 is a top plan view of the valve, Fig. 9 is a sectional view showing the valve detached from the stem, Fig. 10 is a top plan view of the top of the stem.

In the present embodiment of the invention the valve casing 1 has the usual seat 2, with which coöperates the valve 3, the valve and seat having their contacting surfaces beveled as shown. A stem 4 is connected with the valve, and this stem extends through a stuffing box 5 in the bonnet 6 of the casing.

The upper end of the stem as shown in Fig. 5 is reduced at 7, and on the reduced portion is an annular shoulder 8 having oppositely extending radial lugs 9. A yoke comprising a body 10 and arms 11 is connected with the bonnet, the arms being connected to the bonnet and the body has a nut through which is threaded a screw 12.

This screw 12 is axially cored to receive the reduced portion 7 of the stem, and the said screw carries at its upper end a hand wheel 13 and at its lower end a head 14. This head 14 carries a pair of arms 15 which extend on opposite sides of the stem 4, and a split ring 16 is connected with the arms. Referring to Fig. 3 it will be seen that the arms are mortised to receive the ring, and the ring sections are secured to the arms in any suitable manner, as for instance, by pins or screws 17.

A coil spring 18 encircles the reduced portion of the stem between the head 14 and the shoulder, 8, and it will be noticed that this spring is composed of material square in cross section. Referring to Fig. 6 it will be noticed that the upper face of the valve 3 is axially recessed, the recess being threaded to receive a threaded head on the lower end of the stem, and the parts are pinned together by a pin 19. In Fig. 9 the valve 20 which corresponds to the valve 3, has the axial recess in its upper face for receiving the threaded head 21.

In operation the valve is opened by turning the hand wheel to the left in the usual manner. The elements 14—15—16 turn freely in the yoke 10—11, and the valve will merely turn upon its seat under pressure of the spring 18 until the split ring 16 engages beneath the lugs 9 on the collar 8. Then the valve will be lifted from its seat. To close the valve, the hand wheel is turned in the opposite direction. The valve will be turned down upon its seat and ground upon its seat until the spring 18 is compressed. The engagement of the lugs 9 with the arms 15 constrains the stem 4 to turn with the screw. All of the parts, that is the connection between the stem and the screw are outside of the valve casing and accessible for any purpose. The entire mechanism may be removed, by first removing the bonnet.

It will be noticed that the seat 2 in Fig. 7 is detachable from the valve casing, so that both the seat and valve can be removed and replaced with new ones when desired. The seat is threaded into a counter bore in the casing. The rings 16 are split, for convenience in assembling and disassembling. It will be understood that the elements 4—7—8—9 are integral.

I claim:

1. In combination with the valve casing having a valve seat, and the valve coöperating with the seat and having a stem extending out of the casing, of a screw, a yoke connected with the casing and having a nut through which the screw is threaded, said screw and stem having a lost motion connection for permitting them to move longitudinally with respect to each other within limits and for permitting a limited rotary movement with respect to each other, and a spring arranged between the screw and the stem and normally acting to press the valve to its seat.

2. In combination with the valve casing having a valve seat, and the bonnet for closing the casing, and the valve coöperating with the seat and rotatable thereon, said valve having a stem extending through the bonnet, a yoke rigid with the bonnet, a screw threaded through the body of the yoke and slidably connected with the stem, said stem having radial lugs, and the screw carrying a fork whose arms are adapted to engage the lugs to turn the stem, and a spring arranged between the screw and the stem and normally acting to press the valve to its seat.

WILLIE HARRY JOHNSON.